(12) United States Patent
Kidosaki

(10) Patent No.: US 12,512,503 B2
(45) Date of Patent: Dec. 30, 2025

(54) ALL-SOLID-STATE BATTERY AND METHOD OF PRODUCING ALL-SOLID-STATE BATTERY

(71) Applicant: TOYOTA JIDOSHA KABUSHIKI KAISHA, Toyota (JP)

(72) Inventor: Toru Kidosaki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 537 days.

(21) Appl. No.: 17/989,885

(22) Filed: Nov. 18, 2022

(65) Prior Publication Data
US 2023/0253608 A1  Aug. 10, 2023

(30) Foreign Application Priority Data
Feb. 7, 2022  (JP) .................................. 2022-017062

(51) Int. Cl.
*H01M 10/04* (2006.01)
*H01M 4/38* (2006.01)
*H01M 10/0525* (2010.01)
*H01M 10/0562* (2010.01)
*H01M 4/02* (2006.01)

(52) U.S. Cl.
CPC ....... *H01M 10/0436* (2013.01); *H01M 4/386* (2013.01); *H01M 10/0525* (2013.01); *H01M 10/0562* (2013.01); *H01M 2004/027* (2013.01)

(58) Field of Classification Search
CPC ........... H01M 10/0436; H01M 10/052; H01M 10/0525; H01M 10/0562; H01M 10/0585; H01M 2004/027; H01M 2300/0068; H01M 4/0404; H01M 4/043; H01M 4/134; H01M 4/386; H01M 4/661; Y02E 60/10; Y02P 70/50
See application file for complete search history.

(56) References Cited

U.S. PATENT DOCUMENTS

| | | | |
|---|---|---|---|
| 2017/0092988 A1 | 3/2017 | Haga et al. | |
| 2019/0280328 A1 | 9/2019 | Haga et al. | |
| 2019/0305368 A1 | 10/2019 | Mizutani et al. | |
| 2023/0128073 A1* | 4/2023 | Lee ..................... | H01M 50/477 429/152 |

FOREIGN PATENT DOCUMENTS

| | | |
|---|---|---|
| JP | 2010-250968 A | 11/2010 |
| JP | 2013-243112 A | 12/2013 |
| JP | 2016-081617 A | 5/2016 |
| JP | 2016-115681 A | 6/2016 |
| JP | 2016-134254 A | 7/2016 |
| JP | 2017-062939 A | 3/2017 |
| JP | 2018-045779 A | 3/2018 |
| JP | 2019-016484 A | 1/2019 |
| JP | 2019-33053 A | 2/2019 |
| JP | 2019-160516 A | 9/2019 |
| JP | 2019-185897 A | 10/2019 |

* cited by examiner

*Primary Examiner* — Victoria H Lynch
(74) *Attorney, Agent, or Firm* — Oliff PLC

(57) ABSTRACT

An all-solid-state battery in which a positive electrode active material layer, a solid electrolyte layer, a negative electrode active material layer, and a negative electrode current collector are laminated in this order on at least one surface of a positive electrode current collector, wherein the negative electrode active material layer contains a negative electrode active material, and the filling rate of the negative electrode active material layer is less than 80%.

8 Claims, 2 Drawing Sheets

ALL-SOLID-STATE BATTERY AND METHOD OF PRODUCING ALL-SOLID-STATE BATTERY

CROSS-REFERENCE TO RELATED APPLICATION

This application claims priority to Japanese Patent Application No. 2022-017062 filed on Feb. 7, 2022, incorporated herein by reference in its entirety.

BACKGROUND

1. Technical Field

The present disclosure relates to an all-solid-state battery and a method of producing an all-solid-state battery.

2. Description of Related Art

Lithium ion secondary batteries containing a non-aqueous electrolyte have a high voltage and a high capacity, and are widely used as power sources for electronic devices such as mobile phones and laptops and electric vehicles. On the other hand, since the non-aqueous electrolyte is flammable, there are concerns about the safety of lithium ion secondary batteries containing a non-aqueous electrolyte. Therefore, in order to improve the safety, the development of all-solid-state batteries containing a nonflammable solid electrolyte is also progressing.

Japanese Unexamined Patent Application Publication No. 2018-45779 (JP 2018-45779 A) discloses an all-solid-state lithium-ion secondary battery including a negative electrode current collector layer, a negative electrode active material layer, a solid electrolyte layer, a positive electrode active material layer, and a positive electrode current collector layer in this order and in which the negative electrode active material layer contains an alloy material containing at least one selected from among silicon and tin, the filling rate of the solid electrolyte layer calculated according to a predetermined formula is 85% or less, the percentage of elongation of the negative electrode current collector layer in a tensile test is 7.0% or more, and the percentage of elongation of the positive electrode current collector layer in the tensile test is 4.0% or more.

Japanese Unexamined Patent Application Publication No. 2010-250968 (JP 2010-250968 A) discloses a lithium ion secondary battery including a positive electrode, a negative electrode, a polymer layer and a lithium ion permeable insulating layer and in which the polymer layer is formed on the surface of a negative electrode active material layer and contains a first polymer and first inorganic oxide particles, and the lithium ion permeable insulating layer is disposed so that it is interposed between the positive electrode and the negative electrode.

Japanese Unexamined Patent Application Publication No. 2019-160516 (JP 2019-160516 A) discloses an all-solid-state battery in which a negative electrode foil, a negative electrode layer, a solid electrolyte layer and a positive electrode layer are laminated in this order and the area of the solid electrolyte layer and the negative electrode layer is larger than the area of the positive electrode layer, the filling rate of the negative electrode layer is 80% or more, the filling rate of the solid electrolyte layer is 70% or more, the filling rate of the positive electrode layer is 75% or more, and in a plan view, the solid electrolyte layer protrudes from the entire outer peripheral portion of the positive electrode layer.

Japanese Unexamined Patent Application Publication No. 2019-16484 (JP 2019-16484 A) discloses a negative electrode for an all-solid-state battery including a negative electrode mixture layer containing graphite particles and ion-conducting solid electrolyte particles, and in which the graphite particles have a specific surface area of 3.5 $m^2/g$ or more and the content of graphite particles in the negative electrode mixture layer is 70 mass % or more and 90 mass % or less. In addition, the document also describes that the filling rate of the negative electrode active material layer may be 95% or more.

SUMMARY

From previously, there has been a problem of the battery expanding due to the change in volume of the negative electrode active material layer due to charging and discharging. This is because there is a risk of cracking or peeling of the electrode inside the expanded battery, and there is concern of cycle characteristics deteriorating. In JP 2018-45779 A, expansion of the battery is minimized by adjusting the filling rate or the like of the solid electrolyte layer. In JP 2010-250968 A, expansion of the battery is minimized by providing a predetermined polymer layer. In JP 2019-160516 A, expansion of the battery is minimized by adjusting the filling rate of each of the negative electrode layer, the positive electrode layer, and the solid electrolyte layer.

In recent years, developments have been implemented in order to increase the capacity of the negative electrode. When the capacity of the negative electrode increases, since the change in volume of the negative electrode active material layer due to charging and discharging is larger, expansion of the battery is significant. Therefore, there is a demand for a technique for further minimizing expansion of the battery.

Therefore, in view of the above circumstances, a main object of the present disclosure is to provide an all-solid-state battery whose expansion due to charging and discharging can be minimized and a method of producing the same.

As one aspect for solving the above problems, the present disclosure provides an all-solid-state battery in which a positive electrode active material layer, a solid electrolyte layer, a negative electrode active material layer, and a negative electrode current collector are laminated in this order on at least one surface of a positive electrode current collector, the negative electrode active material layer contains a negative electrode active material, and the filling rate of the negative electrode active material layer is less than 80%.

In the all-solid-state battery, the positive electrode active material layer may contain a positive electrode active material, the solid electrolyte layer may contain a solid electrolyte, the filling rate of the positive electrode active material layer may be 85% or more, and the filling rate of the solid electrolyte layer may be 85% or more.

The all-solid-state battery may have the following aspects. That is, in the all-solid-state battery, a first positive electrode active material layer, a first solid electrolyte layer, a first negative electrode active material layer, and a first negative electrode current collector may be laminated in this order on one surface of a positive electrode current collector, a second positive electrode active material layer, a second solid electrolyte layer, a second negative electrode active material layer, and a second negative electrode current collector may be laminated in this order on the other surface of the positive electrode current collector, the first negative electrode active material layer and the second negative electrode active material layer may contain a negative electrode active material, and the filling rate of the first negative electrode active material layer and the second negative electrode active material layer may be less than 80%. In this aspect, the first positive electrode active material layer and the second positive electrode active material layer may contain a positive electrode active material, the first solid electrolyte layer and the first solid electrolyte layer may contain a solid electrolyte, the filling rate of the first positive electrode active material layer and the second positive electrode active material layer may be 85% or more, and the filling rate of the first solid electrolyte layer and the second solid electrolyte layer may be 85% or more.

In the all-solid-state battery, the negative electrode active material may be Si or a Si alloy As one aspect for solving the above problems, the present disclosure provides a method of producing an all-solid-state battery, including a negative electrode producing process in which a negative electrode active material layer and a negative electrode current collector are laminated to obtain a negative electrode; a positive electrode-solid electrolyte layer laminate producing process in which a positive electrode active material layer and a solid electrolyte layer are laminated in this order on at least one surface of a positive electrode current collector to obtain a positive electrode-solid electrolyte layer laminate; and a lamination process in which the positive electrode-solid electrolyte layer laminate and the negative electrode are laminated so that the negative electrode active material layer is disposed on the surface of the solid electrolyte layer, wherein the negative electrode active material layer contains a negative electrode active material, and the filling rate of the negative electrode active material layer is less than 80%.

In the method of producing an all-solid-state battery, the positive electrode active material layer may contain a positive electrode active material, the solid electrolyte layer may contain a solid electrolyte, the filling rate of the positive electrode active material layer may be 85% or more, and the filling rate of the solid electrolyte layer may be 85% or more.

The method of producing an all-solid-state battery may have the following aspect. That is, the method of producing an all-solid-state battery may include a first negative electrode producing process in which a first negative electrode active material layer and a first negative electrode current collector are laminated to obtain a first negative electrode; a second negative electrode producing process in which a second negative electrode active material layer and a second negative electrode current collector are laminated to obtain a second negative electrode; a positive electrode-solid electrolyte layer laminate producing process in which a first positive electrode active material layer and a first solid electrolyte layer are laminated in this order on one surface of the positive electrode current collector and a second positive electrode active material layer and a second solid electrolyte layer are laminated in this order on the other surface of the positive electrode current collector to obtain a positive electrode-solid electrolyte layer laminate; and a lamination process in which the positive electrode-solid electrolyte layer laminate, the first negative electrode, and the second negative electrode are laminated so that the first negative electrode active material layer is disposed on the surface of the first solid electrolyte layer and the second negative electrode active material layer is disposed on the surface of the second solid electrolyte layer, wherein the first negative electrode active material layer and the second negative electrode active material layer may contain a negative electrode active material, and the filling rate of the first negative electrode active material layer and the second negative electrode active material layer may be less than 80%. In this aspect, the first positive electrode active material layer and the second positive electrode active material layer may contain a positive electrode active material, the first solid electrolyte layer and the first solid electrolyte layer may contain a solid electrolyte, the filling rate of the first positive electrode active material layer and the second positive electrode active material layer may be 85% or more, and the filling rate of the first solid electrolyte layer and the second solid electrolyte layer may be 85% or more.

In the method of producing an all-solid-state battery, the negative electrode active material may be Si or a Si alloy.

According to the present disclosure, expansion due to charging and discharging can be minimized.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

1. All-Solid-State Battery

The all-solid-state battery of the present disclosure will be described with reference to all-solid-state batteries 100 and 200 according to one embodiment.

1.1. All-Solid-State Battery 100

Figure 1:
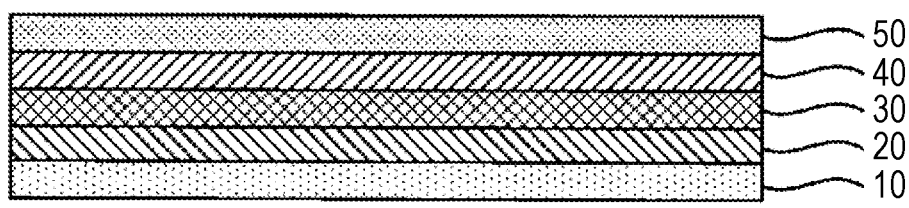
FIG. 1 is a cross-sectional schematic view of an all-solid-state battery 100.

In the all-solid-state battery 100, a positive electrode active material layer 20, a solid electrolyte layer 30, a negative electrode active material layer 40, and a negative electrode current collector 50 are laminated in this order on at least one surface of a positive electrode current collector 10, and the negative electrode active material layer contains a negative electrode active material, and the filling rate of the negative electrode active material layer is less than 80%. FIG. 1 shows a cross-sectional schematic view of the all-solid-state battery 100. FIG. 1 shows a mode in which the positive electrode active material layer 20, the solid electrolyte layer 30, the negative electrode active material layer 40, and the negative electrode current collector 50 are laminated in this order on one surface of the positive electrode current collector 10.

The all-solid-state battery 100 may include the positive electrode current collector 10, the positive electrode active material layer 20, the solid electrolyte layer 30, the negative electrode active material layer 40, and the negative electrode current collector 50 in this order. For example, a laminate including the positive electrode current collector 10, the positive electrode active material layer 20, the solid electrolyte layer 30, the negative electrode active material layer 40, and the negative electrode current collector 50 in this order is used as one constituent unit, and a plurality of such laminates may be provided. In addition, when the plurality of laminates are provided, adjacent laminates may share a current collector. For example, adjacent laminates may share a positive electrode current collector. Specifically, an all-solid-state battery in which a first positive electrode active material layer, a first solid electrolyte layer, a first negative electrode active material layer, and a first negative electrode current collector are laminated on one surface of a positive electrode current collector, and a second positive electrode active material layer, a second solid electrolyte layer, a second negative electrode active material layer, and a second negative electrode current collector are laminated on the other surface of the positive electrode current collector may be used. This embodiment will be described in the section of the all-solid-state battery 200 to be described below.

1.1.1. Positive Electrode Current Collector 10

The material of the positive electrode current collector 10 is not particularly limited, and can be appropriately selected from among known materials according to the purpose. Examples thereof include Cu, Ni, Cr, Au, Pt, Ag, Al, Fe, Ti, Zn, Co, and stainless steel. The thickness of the positive electrode current collector is not particularly limited, and may be appropriately set according to desired battery performance. The thickness is, for example, in a range of 0.1 μm or more and 1 mm or less.

1.1.2. Positive Electrode Active Material Layer 20

The positive electrode active material layer 20 contains a positive electrode active material. The positive electrode active material can be appropriately selected from among known positive electrode active materials used for all-solid-state lithium-ion secondary batteries. Examples thereof include lithium cobalt oxide, nickel cobalt lithium aluminum oxide (NCA), lithium nickel cobalt manganese oxide (NCM), and lithium manganate. The particle size of the positive electrode active material is not particularly limited and is, for example, in a range of 1 μm to 100 μm. The content of the positive electrode active material in the positive electrode active material layer 20 is not particularly limited, and is, for example, in a range of 50 weight % to 99 weight %. In addition, the surface of the positive electrode active material may be covered with an oxide layer such as a lithium niobate layer, a lithium titanate layer, or a lithium phosphate layer.

The positive electrode active material layer 20 may optionally contain a solid electrolyte. The solid electrolyte can be appropriately selected from among known solid electrolytes used for all-solid-state lithium-ion secondary batteries. Examples thereof include a sulfide solid electrolyte, an oxide solid electrolyte, a nitride solid electrolyte, and a halide solid electrolyte. A sulfide solid electrolyte is preferable. The content of the solid electrolyte in the positive electrode active material layer is not particularly limited, and is, for example, in a range of 1 weight % to 50 weight %.

The sulfide solid electrolyte preferably contains elemental Li, elemental M (M is preferably at least one of P, Ge, Si, Sn, B and Al), and elemental S. The sulfide solid electrolyte may further contain a halogen element. Examples of halogen elements include elemental F, elemental Cl, elemental Br, and elemental I. In addition, the amorphous sulfide solid electrolyte may further contain elemental O.

Examples of sulfide solid electrolytes include $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$, (where, m and n are a positive number, and Z is any of Ge, Zn, and Ga), $Li_2S$—$GeS_2$, $Li_2S$—$SiS_2$—$Li_3PO_4$, and $Li_2S$—$SiS_2$-$Li_xMO_y$, (where, x and y are a positive number, and M is any of P, Si, Ge, B, Al, Ga, and In).

Examples of oxide solid electrolytes include lithium-lanthanum-zirconium-containing composite oxide (LLZO), Al-doped LLZO, lithium-lanthanum-titanium-containing composite oxide (LLTO), Al-doped LLTO, and lithium phosphorus oxynitride (LIPON). Examples of nitride solid electrolytes include $Li_3N$ and $Li_3N$—LiI—LiOH. Examples of halide solid electrolytes include LiF, LiCl, LiBr, LiI, and LiI—$Al_2O_3$.

The positive electrode active material layer 20 may optionally contain a conductivity aid. The conductivity aid can be appropriately selected from among known conductive assistant materials used for all-solid-state lithium-ion secondary batteries. Examples thereof include carbon materials such as acetylene black, ketjen black, and vapor grown carbon fibers (VGCF), and metal materials such as nickel, aluminum, and stainless steel. The content of the conductivity aid in the positive electrode active material layer 20 is not particularly limited, and is, for example, in a range of 0.1 weight % to 10 weight %.

The positive electrode active material layer 20 may optionally contain a binder. The binder can be appropriately selected from among known binders used for all-solid-state lithium-ion secondary batteries. Examples thereof include butadiene rubber (BR), butylene rubber (IIR), acrylate butadiene rubber (ABR), styrene-butadiene rubber (SBR) polyvinylidene fluoride (PVdF), and polyvinylidene fluoride-hexafluoropropylene copolymers (PVdF-HFP). The content of the binder in the positive electrode active material layer 20 is not particularly limited, and is, for example, in a range of 0.1 weight % to 10 weight %.

The shape of the positive electrode active material layer 20 is not particularly limited, and a sheet form is preferable. The thickness of the positive electrode active material layer 20 is not particularly limited, and may be appropriately set according to desired battery performance. The thickness is, for example, in a range of 0.1 μm or more and 1 mm or less.

The filling rate of the positive electrode active material layer 20 is not particularly limited, and in order to reduce the battery resistance, it may be 85% or more, 90% or more, or 95% or more.

Here, the "filling rate" in this specification can be calculated from the following formula. "Electrode layer" in the formula refers to an electrode layer for which the filling rate is to be calculated, that is, any of the positive electrode active material layer, the solid electrolyte layer, and the negative electrode active material layer.

Filling rate (%)=[{weight (g) of electrode layer÷true specific gravity (g/cm$^3$) of electrode layer}÷{apparent volume (cm$^3$) of electrode layer}]×100

1.1.3. Solid Electrolyte Layer 30

The solid electrolyte layer 30 contains at least a solid electrolyte. The solid electrolyte can be appropriately selected from among known solid electrolytes used for all-solid-state lithium-ion secondary batteries. For example, a solid electrolyte that can be contained in the above positive electrode active material layer 20 may be exemplified. The content of the solid electrolyte in the solid electrolyte layer 30 is not particularly limited, and is, for example, in a range of 50 weight % to 99 weight %.

The solid electrolyte layer 30 may optionally contain a binder. The binder can be appropriately selected from among known binders used in all-solid-state lithium-ion secondary batteries. For example, a binder that can be contained in the above positive electrode active material layer 20 may be exemplified. The content of the binder in the solid electrolyte layer 30 is not particularly limited and is, for example, in a range of 0.1 weight % to 10 weight %.

The shape of the solid electrolyte layer 30 is not particularly limited, and a sheet form is preferable. The thickness of the solid electrolyte layer 30 is not particularly limited, and may be appropriately set according to desired battery performance. The thickness is, for example, in a range of 0.1 µm or more and 1 mm or less.

The filling rate of the solid electrolyte layer 30 is not particularly limited, and in order to reduce the battery resistance, it may be 85% or more, 90% or more, or 95% or more.

1.1.4. Negative Electrode Active Material Layer 40

The negative electrode active material layer 40 contains a negative electrode active material. The negative electrode active material can be appropriately selected from among known negative electrode active materials used for all-solid-state lithium-ion secondary batteries. Examples thereof include Si, Si alloys, tin, tin alloys, silicon-based active materials such as silicon oxide, carbon-based active materials such as graphite and hard carbon, various oxide-based active materials such as lithium titanate, metallic lithium and lithium alloys.

Among these, the negative electrode active material may be Si or a Si alloy or tin or a tin alloy. Particularly, Si or a Si alloy may be used. This is because these negative electrode active materials have a large theoretical discharging capacity. In addition, this is because, it is known that the volume change due to charging and discharging is particularly large, but the filling rate of the negative electrode active material layer 40 is less than 80% so that the change in the volume of the negative electrode active material is absorbed and expansion of the battery can be minimized.

The negative electrode active material layer 40 may optionally contain a solid electrolyte. The solid electrolyte can be appropriately selected from among known solid electrolytes used for all-solid-state lithium-ion secondary batteries. For example, a solid electrolyte that can be contained in the above positive electrode active material layer may be exemplified. The content of the solid electrolyte in the negative electrode active material layer 40 is not particularly limited, and is, for example, in a range of 1 weight % to 50 weight %.

The negative electrode active material layer 40 may optionally contain a conductivity aid. The conductivity aid can be appropriately selected from among known conductive assistant materials used for all-solid-state lithium-ion secondary batteries. For example, a conductivity aid that can be contained in the above positive electrode active material layer 20 may be exemplified. The content of the conductivity aid in the negative electrode active material layer 40 is not particularly limited, and is, for example, in a range of 0.1 weight % to 10 weight %.

The negative electrode active material layer 40 may optionally contain a binder. The binder can be appropriately selected from among known binders used for all-solid-state lithium-ion secondary batteries. For example, a binder that can be contained in the above positive electrode active material layer 20 may be exemplified. The content of the binder in the negative electrode active material layer 40 is not particularly limited, and is, for example, in a range of 0.1 weight % to 10 weight %.

The shape of the negative electrode active material layer 40 is not particularly limited, and a sheet form is preferable. The thickness of the negative electrode active material layer 40 is not particularly limited, and may be appropriately set according to desired battery performance. The thickness is, for example, in a range of 0.1 µm or more and 1 mm or less.

The filling rate of the negative electrode active material layer 40 is less than 80%. Thereby, the change in volume of the negative electrode active material due to charging and discharging can be absorbed by the negative electrode active material layer itself so that expansion of the all-solid-state battery can be minimized. In particular, when Si or a Si alloy whose change in volume due to charging and discharging is large is used as a negative electrode active material, a significant effect can be exhibited. On the other hand, when the filling rate of the negative electrode active material layer 40 is 80% or more, the change in volume of the negative electrode active material due to charging and discharging cannot be absorbed by the negative electrode active material layer 40 itself, the negative electrode active material layer 40 may crack or peel off, and there is concern of cycle characteristics deteriorating.

The filling rate of the negative electrode active material layer 40 is not particularly limited as long as it is less than 80%, and may be, for example, 70% or less or 60% or less. If the filling rate is smaller, an ability of the negative electrode active material layer 40 itself to absorb the change in volume of the negative electrode active material is stronger, and if the filling rate is too small, there is concern of the mechanical strength of the negative electrode active material layer 40 decreasing and the energy density decreasing. Therefore, the filling rate of the negative electrode active material layer 40 may be 30% or more or 40% or more.

1.1.5. Negative Electrode Current Collector 50

The material of the negative electrode current collector 50 can be appropriately selected from among known materials according to the purpose. Examples thereof include Cu, Ni, Cr, Au, Pt, Ag, Al, Fe, Ti, Zn, Co, and stainless steel. The thickness of the negative electrode current collector 50 is not particularly limited, and may be appropriately set according to desired battery performance. The thickness is, for example, in a range of 0.1 µm or more and 1 mm or less.

1.1.6. Method of Producing all-Solid-State Battery 100

The method of producing the all-solid-state battery 100 is not particularly limited. For example, the positive electrode current collector 10, the positive electrode active material layer 20, the solid electrolyte layer 30, the negative electrode active material layer 40, and the negative electrode current collector 50 are separately prepared and these may be laminated to produce the all-solid-state battery 100. After the lamination, the laminate may be appropriately pressed.

The electrode layers (the positive electrode active material layer 20, the solid electrolyte layer 30, and the negative electrode active material layer 40) can be produced, for example, as follows. The electrode layer can be produced by mixing and pressing the materials constituting the electrode layer. Alternatively, the material constituting the electrode layer is dispersed in an organic solvent to obtain a slurry, the obtained slurry is then applied to a current collector or a substrate and dried, and thereby the electrode layer can be produced.

On the other hand, in the all-solid-state battery 100, the filling rate of the negative electrode active material layer 40 is less than 80%, but, in order to reduce the battery resistance, it is conceivable to set the filling rate of the positive electrode active material layer 20 and the solid electrolyte layer 30 higher than the filling rate of the negative electrode active material layer 40. In order to efficiently produce such an all-solid-state battery 100, a production method 1000 to be described below may be used.

1.2. All-Solid-State Battery 200

Figure 2:
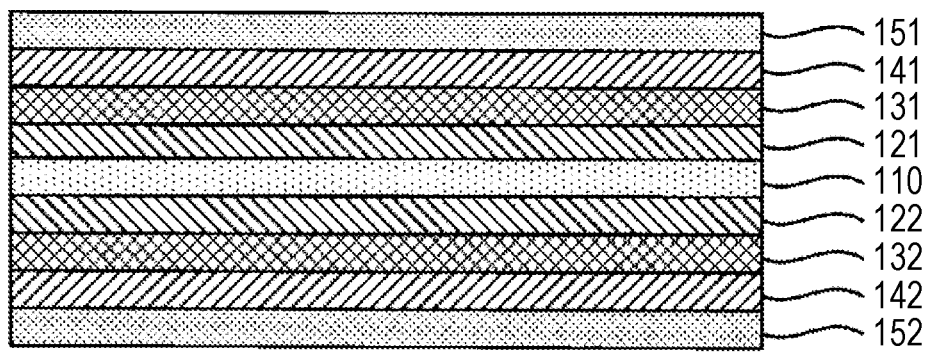
FIG. 2 is a cross-sectional schematic view of an all-solid-state battery 200.

In the all-solid-state battery 200, a first positive electrode active material layer 121, a first solid electrolyte layer 131, a first negative electrode active material layer 141, and a first negative electrode current collector 151 are laminated in this order on one surface of a positive electrode current collector 110, a second positive electrode active material layer 122, a second solid electrolyte layer 132, a second negative electrode active material layer 142, and a second negative electrode current collector 152 are laminated in this order on the other surface of the positive electrode current collector 110, and the first negative electrode active material layer 141 and the second negative electrode active material layer 142 contain a negative electrode active material, and the filling rate of the first negative electrode active material layer 141 and the second negative electrode active material layer 142 is less than 80%. The all-solid-state battery 200 is a specific concept of the all-solid-state battery 100, and shows an example of a mode of a monopolar battery. FIG. 2 shows a cross-sectional schematic view of the all-solid-state battery 200.

1.2.1. Positive Electrode Current Collector 110

Since the configuration that can be adopted by the positive electrode current collector 110 is the same as the configuration that can be adopted by the positive electrode current collector 10, description thereof is omitted here.

1.2.2. First Positive Electrode Active Material Layer 121 and Second Positive Electrode Active Material Layer 122

The first positive electrode active material layer 121 is laminated on one surface of the positive electrode current collector 110, and the second positive electrode active material layer 122 is laminated on the other surface of the positive electrode current collector 110. Since the configuration that can be adopted by the first positive electrode active material layer 121 and the second positive electrode active material layer 122 is the same as the configuration that can be adopted by the positive electrode active material layer 20, description thereof is omitted here. However, the first positive electrode active material layer 121 and the second positive electrode active material layer 122 may have the same configuration or different configurations. The filling rate of the first positive electrode active material layer 121 and the second positive electrode active material layer 122 is not particularly limited, and in order to reduce the battery resistance, it may be 85% or more, 90% or more, or 95% or more.

1.2.3. First Solid Electrolyte Layer 131 and Second Solid Electrolyte Layer 132

The first solid electrolyte layer 131 is laminated on one surface of the first positive electrode active material layer 121, and the second solid electrolyte layer 132 is laminated on the other surface of the second positive electrode active material layer 122. Since the configuration that can be adopted by the first solid electrolyte layer 131 and the second solid electrolyte layer 132 is the same as the configuration that can be adopted by the solid electrolyte layer 30, description thereof is omitted here. However, the first solid electrolyte layer 131 and the second solid electrolyte layer 132 may have the same configuration or different configurations. The filling rate of the first solid electrolyte layer 131 and the second solid electrolyte layer 132 is not particularly limited, and in order to reduce the battery resistance, it may be 85% or more, 90% or more, or 95% or more.

1.2.4. First Negative Electrode Active Material Layer 141 and Second Negative Electrode Active Material Layer 142

The first negative electrode active material layer 141 is laminated on one surface of the first solid electrolyte layer 131, and the second negative electrode active material layer 142 is laminated on the other surface of the second solid electrolyte layer 132. Since the configuration that can be adopted by the first negative electrode active material layer 141 and the second negative electrode active material layer 142 is the same as the configuration that can be adopted by the negative electrode active material layer 40, description thereof is omitted here. However, the first negative electrode active material layer 141 and the second negative electrode active material layer 142 may have the same configuration or different configurations. The filling rate of the first negative electrode active material layer 141 and the second negative electrode active material layer 142 is not particularly limited as long as it is less than 80%, and may be, for example, 70% or less, 60% or less, 30% or more or 40% or more.

1.2.5. First Negative Electrode Current Collector 151 and Second Negative Electrode Current Collector 152

The first negative electrode current collector 151 is laminated on one surface of the first negative electrode active material layer 141, and the second negative electrode current collector 152 is laminated on the other surface of the second negative electrode active material layer 142. Since the configuration that can be adopted by the first negative electrode current collector 151 and the second negative electrode current collector 152 is the same as the configuration that can be adopted by the negative electrode current collector 50, description thereof is omitted here. However, the first negative electrode current collector 151 and the second negative electrode current collector 152 may have the same configuration or different configurations.

1.2.6. Method of Producing all-Solid-State Battery 200

Since the all-solid-state battery 200 is a specific concept of the all-solid-state battery 100, a method of producing the above all-solid-state battery 100 can be appropriately used. On the other hand, in the all-solid-state battery 200, the filling rate of the first negative electrode active material layer 141 and the second negative electrode active material layer 142 is less than 80%. In order to reduce the battery resistance, it is conceivable to set the filling rate of the first positive electrode active material layer 121, the second positive electrode active material layer 122, the first solid electrolyte layer 131, and the second solid electrolyte layer 132 higher than the filling rate of the first negative electrode active material layer 141 and the second negative electrode active material layer 142. In order to efficiently produce such an all-solid-state battery 200, a production method 2000 to be described below may be used.

1.3. Effects

As described in the above embodiments, in the all-solid-state battery of the present disclosure, the filling rate of the negative electrode active material layer is less than 80%. Since the change in volume of the negative electrode active material due to charging and discharging can be absorbed by the negative electrode active material layer 40 itself, expansion of the all-solid-state battery can be minimized. In particular, when Si or a Si alloy whose change in volume due to charging and discharging is large is used as a negative electrode active material, a significant effect can be exhibited. In addition, in the all-solid-state battery of the present disclosure, in order to reduce the battery resistance, the filling rate of the positive electrode active material layer and the solid electrolyte layer may be 85% or more. In this manner, the all-solid-state battery of the present disclosure includes a mode in which the filling rate of the positive electrode active material layer and the solid electrolyte layer is higher than the filling rate of the negative electrode active material layer.

2. Method of Producing all-Solid-State Battery

A method of producing an all-solid-state battery of the present disclosure will be described with reference to the methods of producing an all-solid-state battery 1000 and 2000 according to one embodiment.

2.1. Method of Producing all-Solid-State Battery 1000

Figure 3:
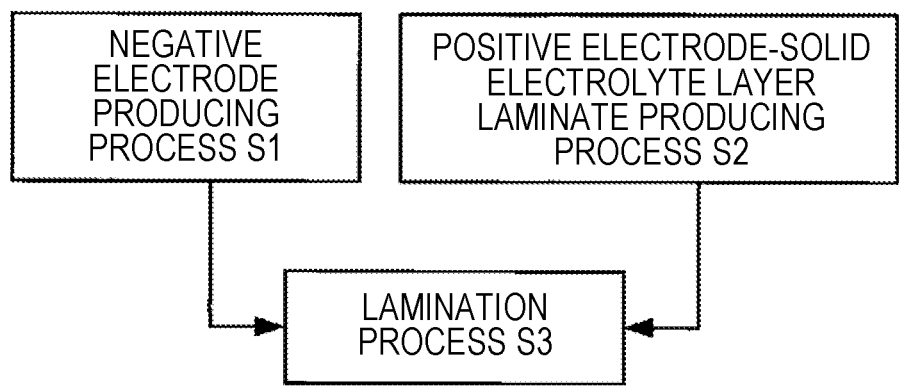
FIG. 3 is a flowchart of a method of producing an all-solid-state battery 1000.

The method of producing an all-solid-state battery 1000 is a method of efficiently producing the all-solid-state battery 100. The method of producing an all-solid-state battery 1000 includes a negative electrode producing process Si in which the negative electrode active material layer 40 and the negative electrode current collector 50 are laminated to obtain a negative electrode, a positive electrode-solid electrolyte layer laminate producing process S2 in which the positive electrode active material layer 20 and the solid electrolyte layer 30 are laminated in this order on at least one surface of the positive electrode current collector 10 to obtain a positive electrode-solid electrolyte layer laminate, and a lamination process S3 in which the positive electrode-solid electrolyte layer laminate and the negative electrode are laminated so that the negative electrode active material layer 40 is disposed on the surface of the solid electrolyte layer 30, and the negative electrode active material layer contains a negative electrode active material, and the filling rate of the negative electrode active material layer is less than 80%. FIG. 3 shows a flowchart of the method of producing an all-solid-state battery 1000.

As shown in FIG. 3, the order in which the negative electrode producing process S1 and the positive electrode-solid electrolyte layer laminate producing process S2 are performed is not limited and any process may be performed first or the processes may be performed in parallel. The lamination process S3 is performed after the negative electrode producing process Si and the positive electrode-solid electrolyte layer laminate producing process S2.

2.1.1. Negative Electrode Producing Process S1

The negative electrode producing process Si is a process in which the negative electrode active material layer 40 and the negative electrode current collector 50 are laminated to obtain a negative electrode.

The method of producing a negative electrode is not particularly limited. For example, the negative electrode can be produced in a dry or wet manner. The method of producing a negative electrode in a dry manner is not particularly limited, and for example, the following method may be used. First, the materials constituting the negative electrode active material layer 40 are mixed and pressed under a predetermined pressure to form the negative electrode active material layer 40. Then, the negative electrode current collector 50 is laminated on the surface of the negative electrode active material layer 40, and thereby the negative electrode can be obtained.

The method of producing a negative electrode in a wet manner is not particularly limited, and for example, the following method may be used. The material constituting the negative electrode active material layer 40 and a predetermined organic solvent are mixed to form a slurry and the slurry is then applied to the negative electrode current collector 50 and dried, and thereby the negative electrode can be obtained.

The method of applying a slurry is not particularly limited, and examples thereof include general methods such as a doctor blade method, a die coating method, a gravure coating method, a spray coating method, an electrostatic coating method, and a bar coating method. The method of drying a slurry is not particularly limited, and for example, the slurry may be heated in a range of 50° C. to 200° C. or lower. In addition, the drying atmosphere may be set to an inert atmosphere or a decompressed atmosphere.

Here, in the negative electrode producing process S1, the filling rate of the negative electrode active material layer 40 may be adjusted to a desired filling rate. However, it is necessary to adjust the filling rate of the negative electrode active material layer 40 to be less than 80%. For example, the negative electrode or the negative electrode active material layer 40 may be pressed to adjust the filling rate of the negative electrode active material layer 40 to a desired filling rate. In consideration of efficiency, after the negative electrode is formed, the negative electrode may be pressed to adjust the filling rate of the negative electrode active material layer 40 to a desired filling rate.

The pressing method is not particularly limited, and for example, flat plate pressing may be used. The surface pressure applied during flat plate pressing may be, for example, 1 MPa or more or 50 MPa or less.

2.1.2. Positive Electrode-Solid Electrolyte Layer Laminate Process S2

The positive electrode-solid electrolyte layer laminate process S2 is a process in which the positive electrode active material layer 20 and the solid electrolyte layer 30 are laminated in this order on at least one surface of the positive electrode current collector 10 to obtain a positive electrode-solid electrolyte layer laminate.

The method of producing a positive electrode-solid electrolyte layer laminate is not particularly limited. For example, the positive electrode-solid electrolyte layer laminate can be produced in a dry or wet manner. The method of producing a positive electrode-solid electrolyte layer laminate in a dry manner is not particularly limited, and for example, the following method may be used. First, the materials constituting the positive electrode active material layer 20 are mixed and pressed under a predetermined pressure to form the positive electrode active material layer 20. The solid electrolyte layer 30 is formed in the same method. Then, the positive electrode active material layer 20 and the solid electrolyte layer 30 are laminated in this order on at least one surface of the positive electrode current collector 10, and thereby the positive electrode-solid electrolyte layer laminate can be obtained.

The method of producing a positive electrode-solid electrolyte layer laminate in a wet manner is not particularly limited, and for example, the following method may be used. The material constituting the positive electrode active material layer 20 and a predetermined organic solvent are mixed to form a slurry and the slurry is then applied to at least one surface of the positive electrode current collector 10 and dried. Thereby, a laminate in which the positive electrode active material layer 20 is laminated on at least one surface of the positive electrode current collector 10 is obtained. Subsequently, the material constituting the solid electrolyte layer 30 and a predetermined organic solvent are mixed to form a slurry, and the slurry is then applied to a substrate and dried to form the solid electrolyte layer 30. Then, the solid electrolyte layer 30 can be transferred onto the surface of the positive electrode active material layer 20 to obtain a positive electrode-solid electrolyte layer laminate. Alternatively, the slurry containing the material constituting the solid electrolyte layer 30 may be directly applied onto the surface of the positive electrode active material layer 20 and dried to obtain a positive electrode-solid electrolyte layer laminate. Since the slurry applying method and the drying temperature are the same as described above, description thereof is omitted here.

Here, in the positive electrode-solid electrolyte layer laminate producing process S2, the filling rate of the positive electrode active material layer 20 may be adjusted to 85% or more. In addition, the filling rate of the solid electrolyte layer may be adjusted to 85% or more. For example, the positive electrode active material layer 20 and the solid electrolyte layer 30 may be pressed individually or in a laminated state (for example, a state of the positive electrode-solid electrolyte layer laminate), and the filling rate of the positive electrode active material layer 20 and the solid electrolyte layer 30 may be adjusted to 85% or more. In consideration of efficiency, after the positive electrode-solid electrolyte layer laminate is formed, the positive electrode-solid electrolyte layer laminate may be pressed to adjust the filling rate of the positive electrode active material layer 20 and the solid electrolyte layer 30 to 85% or more.

The pressing method is not particularly limited, and examples thereof include roll pressing and flat plate pressing. The line pressure applied during roll pressing may be, for example, 1 t/cm or more and 4 t/cm or less. The gap between rollers may be, for example, 0.1 mm or more and 0.3 mm or less. The surface pressure applied during flat plate pressing may be, for example, 400 MPa or more and 1,900 MPa or less.

2.1.3. Lamination Process S3

The lamination process S3 is a process in which the positive electrode-solid electrolyte layer laminate and the negative electrode are laminated so that the negative electrode active material layer 40 is disposed on the surface of the solid electrolyte layer 30. Thereby, the all-solid-state battery 100 can be obtained.

The method of laminating a positive electrode-solid electrolyte layer laminate and a negative electrode is not particularly limited, and the all-solid-state battery 100 may be obtained by simply laminating the positive electrode-solid electrolyte layer laminate and the negative electrode. In this case, in order to reduce the contact resistance of each electrode layer, the all-solid-state battery 100 may be restrained and the restraining pressure directed inward in the lamination direction may be applied. The restraining pressure is not particularly limited, and may be, for example, 0.5 MPa or more and 50 MPa or less. In addition, the obtained all-solid-state battery 100 may be pressed under a predetermined pressure, but it is necessary to focus on the change in the filling rate.

2.2. Method of Producing all-Solid-State Battery 2000

Figure 4:
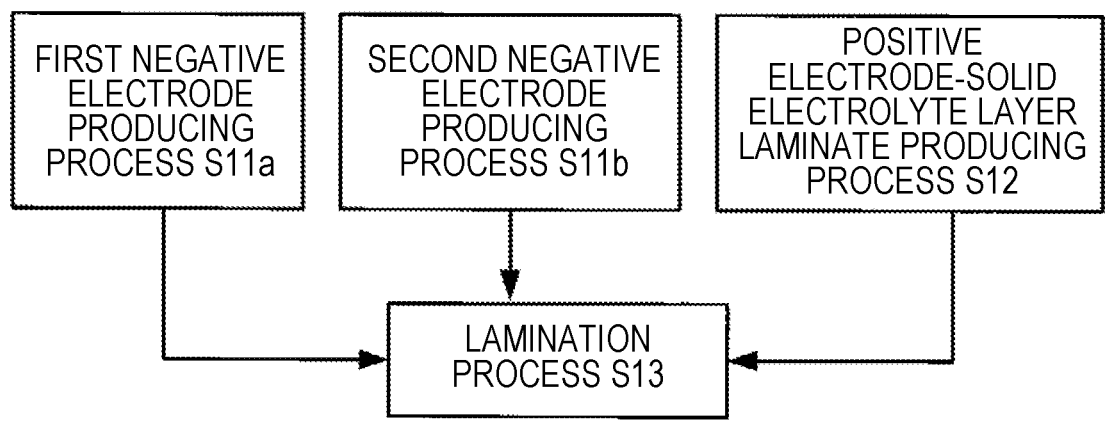
FIG. 4 is a flowchart of a method of producing an all-solid-state battery 2000.

The method of producing an all-solid-state battery 2000 is a method of efficiently producing the all-solid-state battery 200. The method of producing an all-solid-state battery 2000 includes a first negative electrode producing process S11*a* in which the first negative electrode active material layer 141 and the first negative electrode current collector 151 are laminated to obtain a first negative electrode, a second negative electrode producing process S11*b* in which the second negative electrode active material layer 142 and the second negative electrode current collector 152 are laminated to obtain a second negative electrode, a positive electrode-solid electrolyte layer laminate producing process S12 in which the first positive electrode active material layer 121 and the first solid electrolyte layer 131 are laminated in this order on one surface of the positive electrode current collector 110, and the second positive electrode active material layer 122 and the second solid electrolyte layer 132 are laminated in this order on the other surface of the positive electrode current collector 110 to obtain a positive electrode-solid electrolyte layer laminate, and a lamination process S13 in which the positive electrode-solid electrolyte layer laminate, the first negative electrode, and the second negative electrode are laminated so that the first negative electrode active material layer 141 is disposed on the surface of the first solid electrolyte layer 131 and the second negative electrode active material layer 142 are disposed on the surface of the second solid electrolyte layer 132, and the first negative electrode active material layer 141 and the second negative electrode active material layer 142 contain a negative electrode active material, and the filling rate of the first negative electrode active material layer 141 and the second negative electrode active material layer 142 is less than 80%. FIG. 4 shows a flowchart of the method of producing an all-solid-state battery 2000.

As shown in FIG. 4, the order in which the first negative electrode producing process S11*a*, the second negative electrode producing process S11*b* and the positive electrode-solid electrolyte layer laminate producing process S12 are performed is not limited, and any process may be performed first or the processes may be performed in parallel. The lamination process S13 is performed after the first negative electrode producing process S11*a*, the second negative electrode producing process S11*b* and the positive electrode-solid electrolyte layer laminate producing process S12.

2.2.1. First Negative Electrode Producing Process S11*a* and Second Negative Electrode Producing Process S11*b*

The first negative electrode producing process S11*a* is a process in which the first negative electrode active material layer 141 and the first negative electrode current collector 151 are laminated to obtain a first negative electrode. The second negative electrode producing process S11*b* is a process in which the second negative electrode active material layer 142 and the second negative electrode current collector 152 are laminated to obtain a second negative electrode. Since the configuration that can be adopted in the first negative electrode producing process S11*a* and the second negative electrode producing process S11*b* is the same as the configuration that can be adopted in the negative electrode producing process S1, description thereof is omitted here. However, the first negative electrode producing process S11*a* and the second negative electrode producing process S11*b* may be the same as or different from each other.

2.2.2. Positive Electrode-Solid Electrolyte Layer Laminate Process S12

The positive electrode-solid electrolyte layer laminate process S12 is a process in which the first positive electrode active material layer 121 and the first solid electrolyte layer 131 are laminated in this order on one surface of the positive electrode current collector 110 (lamination method A) and the second positive electrode active material layer 122 and the second solid electrolyte layer 132 are laminated in this order on the other surface of the positive electrode current collector 110 (lamination method B) to obtain a positive electrode-solid electrolyte layer laminate. Since the configuration that can be adopted in the lamination methods A and B is the same as the configuration that can be adopted in the positive electrode-solid electrolyte layer laminate process S2, description thereof is omitted here. However, the lamination methods A and B may be the same as or different from each other.

2.2.3. Lamination Process S13

The lamination process S13 is a process in which the positive electrode-solid electrolyte layer laminate, the first negative electrode, and the second negative electrode are laminated so that the first negative electrode active material layer 141 is disposed on the surface of the first solid electrolyte layer 131 and the second negative electrode active material layer 142 is disposed on the surface of the second solid electrolyte layer 132. Thereby, the all-solid-state battery 200 can be obtained. Since the configuration that can be adopted in the lamination process S13 is the same as the configuration that can be adopted in the lamination process S3, description thereof is omitted here.

2.3. Effects

As described in the above embodiments, the method of producing an all-solid-state battery of the present disclosure is a method of efficiently producing an all-solid-state battery of the present disclosure. In particular, in order to reduce the battery resistance, it is conceivable to set the filling rate of the positive electrode active material layer and the solid electrolyte layer higher than the filling rate of the negative electrode active material layer. In such a case, the all-solid-state battery can be produced more efficiently.

In a conventional production method, a negative electrode active material layer, a solid electrolyte layer, and a positive electrode active material layer are laminated on at least one surface of a negative electrode current collector and this laminate is then pressed to densify the positive electrode active material layer and the solid electrolyte layer. Accordingly, the filling rate of the negative electrode active material layer is almost the same as the filling rate of the positive electrode active material layer and the solid electrolyte layer. Since the conventional all-solid-state battery is produced according to such a process, it is difficult to reduce the filling rate of the negative electrode active material layer, and expansion of the battery has become a problem.

The method of producing an all-solid-state battery of the present disclosure focuses on the filling rate of the negative electrode active material layer, which is one cause of battery expansion and is based on the findings obtained from the results of a fundamental review of conventional production methods in order to efficiently produce the all-solid-state battery in which the filling rate of the negative electrode active material layer is adjusted while the positive electrode active material layer and the solid electrolyte layer are densified.

Hereinafter, the present disclosure will be further described with reference to examples.

[Production of all-Solid-State Battery]

All-solid-state batteries of Examples 1 to 4 and Comparative Examples 1 to 3 were produced as described below.

Example 1

(Negative Electrode Producing Process)

18.6 g of a negative electrode active material (Si), 17.6 g of a sulfide-based solid electrolyte ($0.75Li_2S \cdot 0.25P_2S_5$), and 2.4 g of a conductivity aid (VGCF) were put into a container. Then, 1.9 g of SBR as a binder diluted to 5 wt % and diisobutyl ketone (DIBK) as a dispersion medium was added to the container so that the solid content of the paste was 31 wt %. Filmix was used as a kneading device, and these materials were kneaded at a peripheral speed in a range of 5 m/s to 30 m/s to prepare a negative electrode layer paste. Subsequently, the obtained negative electrode active material layer paste was applied to the negative electrode current collector according to a blade coating method using an applicator and dried under conditions of 100° C. and 30 minutes to obtain a negative electrode.

Next, the obtained negative electrode was pressed using a flat press machine. The press surface pressure was 1 MPa. In addition, using the pressed negative electrode, the filling rate of the negative electrode active material layer was calculated. The results are shown in Table 1.

(Positive Electrode-Solid Electrolyte Layer Laminate Producing Process)

First, a positive electrode was produced. 80.0 g of a positive electrode active material ($LiNi_{1/3}Co_{1/3}Mn_{1/3}O_2$), 9.4 g of a sulfide-based solid electrolyte ($0.75Li_2S \cdot 0.25P_2S_5$), and 2.0 g of a conductivity aid (VGCF) were put into a container. Then, 45.7 g of SBR as a binder diluted to 5 wt % and diisobutyl ketone (DIBK) as a dispersion medium was added to the container so that the solid content of the paste was 69 wt %. Filmix was used as a kneading device, and these materials were kneaded at a peripheral speed in a range of 5 m/s to 30 m/s to prepare a positive electrode active material layer paste. Subsequently, the obtained positive electrode active material layer paste was applied to both surfaces of the positive electrode current collector according to a blade coating method using an applicator and dried under conditions of 100° C. and 30 minutes to obtain a positive electrode.

Next, a solid electrolyte layer was produced. These materials were added to a dispersion medium (heptane) so that the sulfide solid electrolyte ($0.75Li_2S \cdot 0.25P_2S_5$) was 95 wt %, and the butadiene binder was 5 wt %, and the mixture was subjected to an ultrasonic treatment using an ultrasonic homogenizer for 5 minutes to obtain a solid electrolyte layer slurry. Subsequently, the obtained solid electrolyte layer paste was applied to a substrate (aluminum foil) according to a blade coating method using an applicator and dried under conditions of 100° C. and 30 minutes to obtain a solid electrolyte layer.

Then, the solid electrolyte layer was transferred to both surfaces of the positive electrode using a pressure of 20 kN. The obtained positive electrode-solid electrolyte layer laminate was pressed using a roll press machine. The press line pressure was 4 ton/cm. The gap between rollers was 100 μm. In addition, using the pressed positive electrode-solid electrolyte layer laminate, the filling rate of the positive electrode active material layer and the solid electrolyte layer was calculated. The results are shown in Table 1.

(Lamination Process)

The negative electrode and the positive electrode-solid electrolyte layer laminate were laminated, a tab was attached to each current collector, and the laminate was then sealed using a laminate sheet. Then, the battery was restrained at a pressure of 20 MPa to obtain an all-solid-state battery of Example 1.

Example 2

An all-solid-state battery of Example 2 was produced in the same method as the method of Example 1 except that the press surface pressure of the flat press machine was changed to 5 MPa in the negative electrode producing process.

Example 3

An all-solid-state battery of Example 3 was produced in the same method as the method of Example 1 except that the press surface pressure of the flat press machine was changed to 20 MPa in the negative electrode producing process.

Example 4

An all-solid-state battery of Example 4 was produced in the same method as the method of Example 1 except that the press surface pressure of the flat press machine was changed to 50 MPa in the negative electrode producing process.

Comparative Example 1

(Negative Electrode Producing Process)

18.6 g of a negative electrode active material (Si), 17.6 g of a sulfide-based solid electrolyte (0.75Li$_2$S·0.25P$_2$S$_5$), and 2.4 g of a conductivity aid (VGCF) were put into a container. Then, 1.9 g of SBR as a binder diluted to 5 wt % and diisobutyl ketone (DIBK) as a dispersion medium was added to the container so that the solid content of the paste was 31 wt %. Filmix was used as a kneading device, and these materials were kneaded at a peripheral speed in a range of 5 m/s to 30 m/s to prepare a negative electrode layer paste. Subsequently, the obtained negative electrode active material layer paste was applied to the negative electrode current collector according to a blade coating method using an applicator and dried under conditions of 100° C. and 30 minutes to obtain a negative electrode.

(Positive Electrode Producing Process)

80.0 g of a Positive Electrode Active Material (LiNi$_{1/3}$Co$_{1/3}$Mn$_{1/3}$O$_2$), 9.4 g of a sulfide-based solid electrolyte (0.75Li$_2$S·0.25P$_2$S$_5$), and 2.0 g of a conductivity aid (VGCF) were put into a container. Then, 45.7 g of SBR as a binder diluted to 5 wt % and diisobutyl ketone (DIBK) as a dispersion medium was added to the container so that the solid content of the paste was 69 wt %. Filmix was used as a kneading device, and these materials were kneaded at a peripheral speed in a range of 5 m/s to 30 m/s to prepare a positive electrode active material layer paste. Subsequently, the obtained positive electrode active material layer paste was applied to both surfaces of the positive electrode current collector according to a blade coating method using an applicator, and dried under conditions of 100° C. and 30 minutes to obtain a positive electrode.

(Solid Electrolyte Layer Producing Process)

These materials were added to a dispersion medium (heptane) such that the sulfide solid electrolyte (0.75Li$_2$S·0.25P$_2$S$_5$) was 95 wt %, and the butadiene binder was 5 wt %, and the mixture was subjected to an ultrasonic treatment using an ultrasonic homogenizer for 5 minutes to obtain a solid electrolyte layer slurry. Subsequently, the obtained solid electrolyte layer paste was applied to a substrate (aluminum foil) according to a blade coating method using an applicator and dried under conditions of 100° C. and 30 minutes to obtain a solid electrolyte layer.

(Lamination Process)

The solid electrolyte layer and the positive electrode were transferred in this order to both surfaces of the obtained negative electrode using a pressure of 20 kN. The obtained laminate was pressed using a roll press machine. The press line pressure was 1 ton/cm. The gap between rollers was 200 μm. In addition, using the pressed laminate, the filling rate of the negative electrode active material layer, the positive electrode active material layer and the solid electrolyte layer was calculated. The results are shown in Table 1.

Then, a tab was attached to each current collector and the laminate was then sealed using a laminate sheet. Then, the battery was restrained at a pressure of 20 MPa to obtain an all-solid-state battery of Comparative Example 1.

Comparative Example 2

An all-solid-state battery of Comparative Example 2 was produced in the same method as the method of Comparative Example 1 except that, in the lamination process, the press line pressure of the roll press machine was changed to 2 ton/cm, and the gap between rollers was changed to 150 μm.

Comparative Example 3

An all-solid-state battery of Comparative Example 3 was produced in the same method as the method of Comparative Example 1 except that, in the lamination process, the press line pressure of the roll press machine was changed to 4 ton/cm, and the gap between rollers was changed to 100 μm.

[Evaluation]

A pressure sensor and a displacement sensor were attached to the produced all-solid-state battery restraint, and these sensors were connected to NR600 data logger (commercially available from KEYENCE). Subsequently, CCCV charging and discharging of 0.1C was performed on the all-solid-state battery in a range of an upper limit voltage of 4.05 V to a lower limit voltage of 2.5. Here, a designed capacity of the all-solid-state battery was 0.3 Ah. From the obtained results, based on the following formula, the change in restraining pressure and the change in film thickness of the all-solid-state battery were calculated. The results are shown in Table 1. Change in restraining pressure (ΔMPa/Ah)=amount of change in pressure during 1$^{st}$ cycle (MPa)/charging capacity (Ah) during 1$^{st}$ cycle Change in film thickness (Δ μm/Ah)=amount of change in film thickness during 1$^{st}$ cycle (MPa)/charging capacity (Ah) during 1$^{st}$ cycle

TABLE 1

|  | Filling rate of negative electrode active material layer (%) | Filling rate of positive electrode active material layer (%) | Filling rate of sold electrolyte layer (%) | Change in restraining pressure (ΔMPa/Ah) | Change in film thickness (Δ μm/Ah) |
| --- | --- | --- | --- | --- | --- |
| Example 1 | 39 | 90 | 98 | 0.59 | 21.7 |
| Example 2 | 45 | 86 | 96 | 0.62 | 22.8 |
| Example 3 | 54 | 92 | 95 | 0.67 | 25.5 |
| Example 4 | 67 | 91 | 98 | 0.70 | 27.1 |
| Comparative Example 1 | 81 | 89 | 98 | 0.88 | 33.4 |
| Comparative Example 2 | 85 | 91 | 97 | 0.89 | 33.6 |
| Comparative Example 3 | 89 | 90 | 98 | 0.88 | 33.8 |

[Results]

In Examples 1 to 4, the values of change in restraining pressure and change in film thickness were smaller than those of Comparative Examples 1 to 3. Therefore, in Examples 1 to 4, expansion of the batteries could be minimized. In addition, focusing on the filling rate of the negative electrode active material layer, the filling rate of Examples 1 to 4 was less than 80%, but the filling rate of Comparative Examples 1 to 3 was 80% or more. Here, the value of change in restraining pressure of Examples 1 to 4 was 0.8 MPa/Ah or less, and the value of change in film thickness was 30 μm/Ah or less. On the other hand, the value of change in restraining pressure of Comparative Examples 1 to 3 was larger than 0.8 MPa/Ah, the value of change in film thickness was larger than 30 μm/Ah, and there was concern about deterioration in cycle characteristics due to cracking or peeling of the electrode layer in the battery. From the above, it was conceivable that, when the filling rate of the negative electrode active material was less than 80%, deterioration in cycle characteristics due to cracking or peeling of the electrode layer in the battery could also be minimized.

What is claimed is:

1. An all-solid-state battery in which a positive electrode active material layer, a solid electrolyte layer, a negative electrode active material layer, and a negative electrode current collector are laminated in this order on at least one surface of a positive electrode current collector,
    wherein the negative electrode active material layer contains a negative electrode active material,
    wherein a filling rate of the negative electrode active material layer is 39% or more and 45% or less,
    wherein the negative electrode active material is Si or a Si alloy,
    wherein the solid electrolyte layer contains a solid electrolyte,
    wherein the solid electrolyte comprises a sulfide solid electrolyte, and
    wherein a filling rate of the solid electrolyte layer is 85% or more.

2. The all-solid-state battery according to claim 1,
    wherein the positive electrode active material layer contains a positive electrode active material, and
    wherein the filling rate of the positive electrode active material layer is 85% or more.

3. The all-solid-state battery according to claim 1,
    wherein a first positive electrode active material layer, a first solid electrolyte layer, a first negative electrode active material layer, and a first negative electrode current collector are laminated in this order on one surface of the positive electrode current collector,
    wherein a second positive electrode active material layer, a second solid electrolyte layer, a second negative electrode active material layer, and a second negative electrode current collector are laminated in this order on the other surface of the positive electrode current collector,
    wherein the first negative electrode active material layer and the second negative electrode active material layer contain the negative electrode active material, and
    wherein the filling rate of the first negative electrode active material layer and the second negative electrode active material layer is less than 80%.

4. The all-solid-state battery according to claim 3,
    wherein the first positive electrode active material layer and the second positive electrode active material layer contain a positive electrode active material,
    wherein the first solid electrolyte layer and the second solid electrolyte layer contain a solid electrolyte,
    wherein the filling rate of the first positive electrode active material layer and the second positive electrode active material layer is 85% or more, and
    wherein the filling rate of the first solid electrolyte layer and the second solid electrolyte layer is 85% or more.

5. A method of producing an all-solid-state battery, comprising:
    a negative electrode producing process in which a negative electrode active material layer and a negative electrode current collector are laminated to obtain a negative electrode;
    a positive electrode-solid electrolyte layer laminate producing process in which a positive electrode active material layer and a solid electrolyte layer are laminated in this order on at least one surface of a positive electrode current collector to obtain a positive electrode-solid electrolyte layer laminate; and
    a lamination process in which the positive electrode-solid electrolyte layer laminate and the negative electrode are laminated so that the negative electrode active material layer is disposed on the surface of the solid electrolyte layer,
    wherein the negative electrode active material layer contains a negative electrode active material,
    wherein a filling rate of the negative electrode active material layer is 39% or more and 45% or less,
    wherein the negative electrode active material is Si or a Si alloy,
    wherein the solid electrolyte layer contains a solid electrolyte,
    wherein the solid electrolyte comprises a sulfide solid electrolyte, and
    wherein a filling rate of the solid electrolyte layer is 85% or more.

6. The method of producing an all-solid-state battery according to claim 5,
    wherein the positive electrode active material layer contains a positive electrode active material, and
    wherein the filling rate of the positive electrode active material layer is 85% or more.

7. The method of producing an all-solid-state battery according to claim 5, comprising:
    a first negative electrode producing process in which a first negative electrode active material layer and a first negative electrode current collector are laminated to obtain a first negative electrode;
    a second negative electrode producing process in which a second negative electrode active material layer and a second negative electrode current collector are laminated to obtain a second negative electrode;
    the positive electrode-solid electrolyte layer laminate producing process in which a first positive electrode active material layer and a first solid electrolyte layer are laminated in this order on one surface of the positive electrode current collector, and a second positive electrode active material layer and a second solid electrolyte layer are laminated in this order on the other surface of the positive electrode current collector to obtain the positive electrode-solid electrolyte layer laminate; and
    a lamination process in which the positive electrode-solid electrolyte layer laminate, the first negative electrode, and the second negative electrode are laminated so that the first negative electrode active material layer is disposed on the surface of the first solid electrolyte layer and the second negative electrode active material layer is disposed on the surface of the second solid electrolyte layer, wherein the first negative electrode active material layer and the second negative electrode active material layer contain the negative electrode active material, and wherein the filling rate of the first negative electrode active material layer and the second negative electrode active material layer is less than 80%.

8. The method of producing an all-solid-state battery according to claim 7, wherein the first positive electrode active material layer and the second positive electrode active material layer contain a positive electrode active material, wherein the first solid electrolyte layer and the second solid electrolyte layer contain a solid electrolyte, wherein the filling rate of the first positive electrode active material layer and the second positive electrode active material layer is 85% or more, and wherein the filling rate of the first solid electrolyte layer and the second solid electrolyte layer is 85% or more.

\* \* \* \* \*